United States Patent Office 3,847,927
Patented Nov. 12, 1974

3,847,927
SULFUR-CONTAINING HYDROXYPYRIDONES
Joseph E. Dunbar, Robert F. Harris, and James R. McCarthy, Jr., Midland, Mich., assignors to The Dow Chemical Company, Midland, Mich.
No Drawing. Filed Dec. 20, 1972, Ser. No. 316,724
Int. Cl. C07d 31/50
U.S. Cl. 260—294.8 F    13 Claims

ABSTRACT OF THE DISCLOSURE

Concerns sulfur-containing hydroxypyridones of the formula

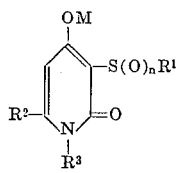

in which M is hydrogen or an alkali metal, $R^1$ is alkyl, phenyl, halophenyl, nitrophenyl, 2-(lower alkylthio)ethyl, allyl, benzyl or lower alkylphenyl, $R^2$ is hydrogen or lower alkyl, $R^3$ is hydrogen or lower alkyl and $n$ is 0, 1 or 2. The compounds are prepared by reacting an alkali metal salt of a 4-hydroxy-2-(1H)-pyridone with a methanethiolsulfonate, and, if desired, oxidizing the resulting $SR^1$ group with hydrogen peroxide to give the corresponding sulfinyl or sulfonyl compound. The compounds have plant growth regulating, antimicrobial and pesticidal activity.

SUMMARY OF THE INVENTION

This invention concerns sulfur-containing hydroxypyridones corresponding to the formula

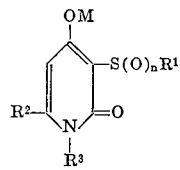

wherein M represents hydrogen or an alkali metal, $R^1$ represents a 1 to 20 carbon atom alkyl group, phenyl, halophenyl, nitrophenyl, 2-(lower alkylthio)ethyl, allyl, benzyl or lower alkylphenyl, $R^2$ represents hydrogen or lower alkyl, $R^3$ represents hydrogen or lower alkyl and $n$ represents an integer from 0 to 2. In the specification and claims, "lower alkyl" designates a straight or branched chain alkyl group having from 1 to 4 carbon atoms and "halo" designates fluoro, chloro or bromo.

The compounds are prepared in the following several ways.

General Procedure for the Thiosulfonate Route

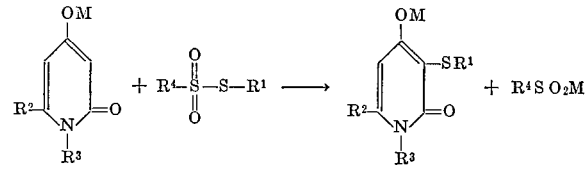

A mixture of the alkali metal salt or amine salt of the 4-hydroxy-2-(1H)-pyridone, the thiosulfonate (preferably substantially equimolar amounts) and a polar organic solvent, i.e., ethanol, methanol, 2-propanol, acetonitrile, acetone, methyl ethyl ketone, methyl isobutyl ketone, benzene, toluene, dimethylformamide or chloroform is heated up to or somewhat below the boiling temperature of the solvent with stirring for a period of time necessary for the completion of the reaction (about 30 minutes to 24 hours). The solvent is then removed by evaporation or distillation, and the residue is triturated with water to remove the by-product sulfinate salt. The crude product is collected on a filter, washed with a solvent that is miscible with water but in which the product is only sparingly soluble at ambient temperature, and dried. The crude product is then purified by one or more recrystallizations from an appropriate solvent, advantageously ethyl acetate, ethanol, aqueous dimethylformamide, methanol, 2-propanol, dimethylformamide, benzene, toluene or any combination of the foregoing solvents. Purification may also be accomplished by dissolving the product hydroxypyridone in an aqueous solution of a molar equivalent of sodium or potassium hydroxide, extracting the resulting solution with a solvent in which the aqueous alkalinesoluble organic impurities are soluble, treating the aqueous solution with activated charcoal, filtering to remove the charcoal and acidifying with a dilute mineral acid such as hydrochloric or sulfuric acid and collecting the purified product on a filter. The residual acid is washed from the product with water, and the product 4-hydroxy-3-substituted thio-2(1H)-pyridone is then dried.

In an alternative procedure the monoalkali metal salt of the 4-hydroxy-2(1H)-pyridone is first prepared by adding an aqueous solution of the alkali metal hydroxide to a solution of a molar equivalent amount of the 4-hydroxy-2(1H)-pyridone in an appropriate solvent, advantageously methanol, ethanol, 2-propanol, acetone, methyl ethyl ketone or acetonitrile. The thiolsulfonate-containing reaction mixture is then heated up to or below the boiling temperature of the solvent with stirring for a period of time necessary for the completion of the reaction (about 30 minutes to 24 hours). Following the reaction period, the reaction mixture is concentrated by removing some of the solvent by evaporation or distillation. The product crystallizes upon cooling the concentrate and is collected on a filter. The product, thus obtained, is often pure at this point in the procedure. If necessary it can be purified as shown above.

In a second alternative procedure the 4-hydroxy-2(1H)-pyridone is dissolved in an aqueous solution of a molar equivalent amount of an alkali metal hydroxide. The thiolsulfonate is then added, and the reaction mixture is heated under reflux with stirring for a period of time necessary for the completion of the reaction (about 30 minutes to 24 hours). Following the reaction period the mixture is cooled, and the product is collected on a filter and dried.

General Procedure for the Sulfenyl Chloride Route

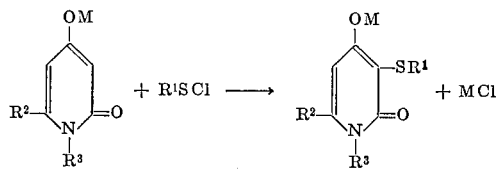

A corresponding arene- or alkanesulfenyl chloride is added to a stirred slurry of the alkali metal salt of the 4-hydroxy-2(1H)-pyridone (advantageously a substantially molar equivalent amount) in an appropriate inert organic solvent, i.e., acetonitrile, benzene, toluene, xylene, naphtha, chloroform, carbon tetrachloride, methylene chloride or 1,1,1-trichloroethane, and the reaction mixture is stirred at ambient temperature for that period of time necessary for substantial completion of the reaction (about 30 minutes to 24 hours). The precipitated product is collected on a filter, washed with water to remove the by-product alkali metal chloride and dried. If the product does not precipitate, the solvent is removed by evaporation or distillation, and the crude product washed with water and dried. The crude product is purified as shown above.
In an alternative procedure a mixture of the arene- or alkanesulfenyl chloride, the 4-hydroxy-2(1H)-pyridone (preferably, but not necessarily, a molar equivalent amount) and a molar amount or an excess of a molar amount of a basic, tertiary amine, such as trimethylamine, triethylamine, pyridine, collidine, lutidine or picoline, in an appropriate solvent such as acetonitrile, benzene, toluene, xylene, naphtha, chloroform, carbon tetrachloride, methylene chloride or 1,1,1-trichloroethane is heated under reflux with stirring for a period of time of about 30 minutes to 24 hours. The precipitated product is collected on a filter, washed with water and dried. If the product does not precipitate on cooling the reaction mixture, the solvent is removed by evaporation or distillation and the product washed with water and dried. The crude product is purified as shown above.

In a second alternative procedure the 4-hydroxy-2(1H)-pyridone is suspended in a basic, tertiary amine, such as lutidine, picoline, pyridine or collidine, and the corresponding alkalne- or arenesulfenyl chloride is added slowly thereto, while the temperature of the reaction mixture is maintained at about 10° to about 25° C. by means of a cooling bath. After the addition of the sulfenyl chloride is complete, the mixture is stirred at ambient temperature for a period of time of about 30 minutes to 24 hours. The crude product is then obtained by pouring the reaction mixture into ice water containing an excess of mineral acid, such as sulfuric or hydrochloric acid, and collecting the crude product on a filter. The crude product can also be obtained from the reaction mixture by removing the amine solvent by evaporation or distillation and washing the residue with water. After drying, the crude product is purified as described above.

DESCRIPTION OF SOME PREFERRED EMBODIMENTS

The following examples illustrate the present invention, the manner and process of making and using the same and the best mode embodiments thereof but should not be construed as limiting the overall scope of the invention. Temperatures given are in centigrade degrees. The compounds are identified by one or more of elemental analysis, infrared spectra (ir), ultraviolet spectra (uv) and nuclear magnetic resonance (nmr).

EXAMPLE 1.—4-Hydroxy-6-methyl-3-methylthio-2(1H)-pyridone

To a suspension of 14.7 grams (0.100 mole) of the monosodium salt of 4-hydroxy-6-methyl-2(1H)-pyridone in 250 ml. of ethanol was added with stirring 12.6 grams (0.100 mole) of methyl methanethiolsulfonate, and the mixture was heated under reflux with stirring for three hours. The solvent was then removed from the reaction mixture by evaporation *in vacuo*, leaving a light pink crystalline solid, which was washed with water at room temperature to remove the water-soluble by-product sodium methanesulfinate. Recrystallization from ethyl acetate gave 5.2 grams of the pure product 4-hydroxy-6-methyl-3-methylthio-2(1H)-pyridone as white, fibrous crystals, m.p. 215–216° C. Concentration of the filtrate yielded 2.1 g. more product, m.p. 206–212° C., giving a total yield of 7.3 grams (43%).

*Analysis.*—Calcd. for $C_7H_9NO_2S$: C, 49.10; H, 5.29; N, 8.18; S, 18.73. Found: C, 49.0; H, 5.17; N, 8.4; S, 18.8.

EXAMPLE 2.—4-Hydroxy-6-methyl-3-methylthio-2(1H)-pyridone

A mixture of 73.6 grams (0.500 mole) of the monosodium salt of 4-hydroxy-6-methyl-2(1H)-pyridone and 85.1 grams (0.500 mole) of methyl p-toluenethiolsulfonate in 1250 ml. of ethanol was heated under reflux with stirring for 2.5 hours, and the ethanol was removed by distillation *in vacuo*, leaving a tan solid which was stirred for 30 minutes with 750 ml. of water at room temperature to remove the by-product sodium p-toluenesulfinate. The water-insoluble solid was collected on a filter and washed with 300 ml. of ethanol at room temperature, leaving 28.4 grams of tan solid, m.p. 213.5–214.5° C. The ethanol filtrate was concentrated to yield an additional 9.5 g. of white solid, m.p. 202–204° C.; total yield, 37.9 grams (44%).

EXAMPLE 3.—4-Hydroxy-6-methyl-3-methylthio-2(1H)-pyridone

4-Hydroxy-6-methyl-2(1H)-pyridone (12.6 grams, 0.100 mole) was dissolved in a solution of sodium hydroxide (4.0 grams, 0.100 mole) and water (300 ml.). Methyl p-toluenethiolsulfonate (20.2 grams, 0.100 mole) was added and the mixture heated at reflux with stirring for 7.5 hours. The resultant solution was evaporated to 50 ml. *in vacuo* to yield 13.1 grams of the crude substance, m.p. 175–179° C. Recrystallization from ethanol gave 5.2 grams (34%) of the product 4-hydroxy-6-methyl-3-methylthio-2(1H)-pyridone as cream colored crystals, m.p. 214–215° C.

EXAMPLE 4.—4-Hydroxy-6-methyl-3-ethylthio-2(1H)-pyridone

A mixture of the monosodium salt of 4-hydroxy-6-methyl-2(1H)-pyridone (27.8 grams, 0.189 mole) ethyl p-toluenethiolsulfonate (40.8 grams, 0.189 mole) and ethanol (500 ml.) was heated at reflux temperature with stirring for 21 hours. The ethanol was removed by distillation *in vacuo* and the solid residue triturated with water (300 ml.), leaving 28.0 grams of the crude product, m.p. 172–180° C. Recrystallization from ethanol gave 18.9 grams (55%) of white crystals, m.p. 180–185° C. (dec.). A second recrystallization from ethanol gave the pure product 4-hydroxy-6-methyl-3-ethylthio-2(1H)-pyridone as white crystals, m.p. 183.5–185° C. (dec.).

*Analysis.*—Calcd. for $C_8H_{11}NO_2S$: C, 51.9; H, 5.59; N, 7.56. Found: C, 52.4; H, 5.95; N, 7.7.

EXAMPLE 5.—4-Hydroxy-6-methyl-3-phenylthio-2(1H)-pyridone

A mixture of the monosodium salt of 4-hydroxy-6-methyl-2(1H)-pyridone (22.0 grams, 0.150 mole), phenyl benzenethiolsulfonate (37.5 grams, 0.150 mole) and ethanol (375 ml.) was heated at reflux temperature with stirring for three hours. The ethanol was removed by distillation, and the solid residue was triturated with water (100 ml.). The crude product was collected on a filter, washed with ethanol and dried. The white, crystalline solid weighed 29.0 grams (85%) and melted at 230–232° C. (dec.). Recrystallization from aqueous dimethylformamide gave the pure product 4-hydroxy-6-methyl-3-phenylthio-2(1H)-pyridone as white crystals, m.p. 232.5–234° C. (dec.).

*Analysis.*—Calcd. for $C_{12}H_{11}NO_2S$: C, 61.78; H, 4.75; N, 6.01; S, 13.74. Found: C, 61.8; H, 5.05; N, 6.1; S, 13.9.

EXAMPLE 6.—4-Hydroxy-6-methyl-3-phenylthio-2(1H)-pyridone

4-Hydroxy-6-methyl-2(1H)-pyridone (6.3 grams, 0.050 mole) was dissolved in a solution of sodium hydroxide (2.0 grams, 0.050 mole) and water (150 ml.). Phenyl benzenethiolsulfonate was added and the mixture heated at reflux temperature with stirring for four hours. The pure, white, crystalline product 11.0 grams, 95% yield, m.p. 232.5–234° C. (dec.) was collected on a filter and dried. The aqueous filtrate was acidified with dilute hydrochloric acid to give 7.1 grams (99%) of the by-product benzensulfinic acid, m.p. 81–84° C.

EXAMPLE 7.—4-Hydroxy-6-methyl-3-phenylthio-2(1H)-pyridone

Benzenesulfenyl chloride (7.2 grams, 0.050 ml.) was added to a slurry of the monosodium salt of 4-hydroxy-6- methyl-2(1H)-pyridone (7.4 grams, 0.050 mole) in benzene (125 ml.) over a period of 15 minutes. The reaction temperature was maintained at 25–27° C. by means of an ice bath. After the addition was complete the reaction mixture was stirred at ambient temperature for 15 minutes and then heated at reflux temperature with stirring for 30 minutes. The benzene was removed by distillation *in vacuo* and the residue triturated with water. The solid was collected on a filter, washed with ethanol and dried. The white, crystalline product weighed 8.6 grams (74%) and melted at 226–230° C. (dec.)

EXAMPLE 8.—4-Hydroxy-6-methyl-3-phenylthio-2(1H)-pyridone

4-Hydroxy-6-methyl-2(1H)-pyridone (6.3 grams, 0.050 mole) was suspended in 125 ml. of pyridine, and benzenesulfenyl chloride was added dropwise over a 10 minute period with stirring, while the temperature was maintained at 25° C. by means of an ice bath. After the addition was complete the mixture was stirred at ambient temperature for three hours. The resulting light green solution was evaporated to dryness *in vacuo* and the residue triturated with water. After the light green, crystalline, crude product (7.0 grams, 60% yield) was collected on a filter, washed with ethanol and dried, it melted at 218–230° C.

EXAMPLE 9.—3-*p*-Chlorophenylthio-4-hydroxy-6-methyl-2(1H)-pyridone

A mixture of the monosodium salt of 4-hydroxy-6-methyl-2(1H)-pyridone (29.4 grams, 0.200 mole), *p*-chlorophenyl *p*-toluenethiolsulfonate (59.8 grams, 0.200 mole) and 500 ml. of ethanol was heated with stirring at reflux temperature for seven hours. The ethanol was removed by distillation *in vacuo* and the residue triturated with 400 ml. of water. The crude product was collected on a filter and recrystallized from methanol to give 33.8 grams (63%) of white, crystalline solid, m.p. 253–254° C. (dec.). A second recrystallization from methanol gave the pure product 3-*p*-chlorophenylthio - 4 - hydroxy - 6-methyl-2(1H)-pyridone as white crystals, m.p. 255.5–256.5° C. (dec.).

*Analysis.*—Calcd. for $C_{12}H_{10}ClNO_2S$: C, 53.8; H, 3.76; N, 5.23. Found: C, 53.6; H, 3.85; N, 5.0.

EXAMPLE 10.—4-Hydroxy-6-methyl-3-(2-nitrophenyl-thio)-2(1H)-pyridone

A mixture of 6.8 grams (0.023 mole of *o*-nitrophenyl benzenethiosulfonate and 3.4 grams (0.023 mole) of the monosodium salt of 4-hydroxy-6-methyl-2(1H)-pyridone in 60 ml. of ethanol was heated under reflux with stirring for 30 minutes. When the temperature of the mixture first reached the boiling point, complete solution was attained, but shortly afterward the yellow product began precipitating. After the heating period the reaction mixture was allowed to cool to room temperature, and the crude product was collected on a filter and washed with water to remove the by-product sodium benzenesulfinate. The remaining, water-insoluble, light yellow solid weighed 5.0 grams (78%) and melted at 282.5° C. (dec.). A portion of this substance was recrystallized from aqueous dimethylformamide to give the pure product 4-hydroxy-6-methyl-3-(2-nitrophenylthio)-2(1H)-pyridone as light yellow crystals, m.p. 282° C. (dec.).

*Analysis.*—Calcd. for $C_{12}H_{10}N_2O_4S$: C, 51.79; H, 3.62; N, 10.07. Found: C, 52.06; H, 3.68; N, 10.13.

EXAMPLE 11.—4-Hydroxy-6-methyl-3-(2-nitrophenyl-thio)-2(1H)-pyridone

*o*-Nitrobenzenesulfenyl chloride (19.0 g., 0.100 mole) was added to a slurry of 14.7 g. (0.100 mole) of the monosodium salt of 4-hydroxy-6-methyl-2(1H)-pyridone in 250 ml. of acetonitrile. An exothermic reaction was observed, causing a 5° C. rise in temperature. The reaction mixture was stirred for three hours without external heating. The solid precipitate was then collected on a filter, washed with water and then with methylene chloride and dried *in vacuo*. The crude product was recrystallized from dimethylformamide giving the product as 20.1 g. (43%) of yellow crystals, m.p. 290° C. (dec.).

EXAMPLE 12.—4-Hydroxy-6-methyl-3-(2-propylthio)-2(1H)-pyridone

A mixture of the monosodium salt of 4-hydroxy-6-methyl-2(1H)-pyridone (27.1 g., 0.184 mol.), *i*-propyl-*p*-tolylthiosulfonate (42.5 g., 0.184 mol.), and 2B absolute ethanol (460 ml.) was heated at reflux with stirring for 20 hours. The ethanol was removed by distillation *in vacuo* and the residue triturated with water (300 ml.). The crude product was removed by filtration, 31.2 g. (m.p. 178–202° C. 75% yield); after recrystallization from ethanol, 10.8 g., m.p. 220–221.5° C., 30% yield. The aqueous filtrate was acidified with dilute HCl producing 14.6 g. (51% yield) of the by-product *p*-tolylsulfinic acid, m.p. 87–88° C.

*Analysis.*—Calcd. for $C_9H_{13}NO_2S$: C, 54.3; H, 6.57; N, 7.0. Found: C, 54.2; H, 6.53; N, 7.0.

EXAMPLE 13.—3-Benzylthio-4-hydroxy-6-methyl-2(1H)-pyridone

A mixture of the monosodium salt of 4-hydroxy-6-methyl-2(1H)-pyridone (29.4 g., 0.200 mol.), benzyl *p*-tolylthiosulfonate (55.6 g., 0.200 mol.), and 2B absolute ethanol (500 ml.) was heated at reflux for 5 hours. The ethanol was removed by distillation *in vacuo* and the residue triturated with water (300 ml.). The crude product was removed by filtration, 48.8 g. (m.p. 167–181° C., 93% yield); after washing with methanol and then 2-propanol, 21.5 g., m.p. 188–193° C., 44% yield. Recrystallization from ethanol gave the pure product, m.p. 197–197.5° C. The aqueous filtrate was acidified with dilute HCl producing 21.4 g. (69% yield) of the by-product *p*-tolylsulfinic acid, m.p. 85–87° C.

*Analysis.*—Calcd. for $C_{13}H_{13}NO_2S$: C, 63.1; H, 5.30; N, 5.7. Found: C, 62.9; H, 5.04; N, 5.8.

EXAMPLE 14.—4-Hydroxy-6-methyl-3-phenylthio-2(1-methyl)-pyridone

4-Hydroxy-6-methyl-2(1 - methyl) - pyridone (7.0 g., 0.050 mol.) was dissolved in a solution of sodium hydroxide (2.0 g., 0.050 mol.) and water (150 ml.). Phenyl benzenethiolsulfonate (12.5 g., 0.050 mol.) was added and the mixture heated at reflux for 4 hours. The resultant slurry was filtered, 11.6 g., m.p. 189–202 (dec.), 95% yield; after recrystallization from methanol, 7.6 g. colorless needles, m.p. 214.5–215.5° C. (dec.), 62% yield.

*Analysis.*—Calcd. for $C_{13}H_{13}NO_2S$: C, 63.1; H, 5.30; N, 5.67. Found: C, 63.1; H, 5.16; N, 5.6.

EXAMPLE 15.—3-Dodecylthio-4-hydroxy-6-methyl-2(1H)-pyridone

A solution of the monosodium salt of 4-hydroxy-6-methyl - 2(1H) - pyridone was prepared by adding 4.00 g. (0.100 mole) of sodium hydroxide in 50 ml. of water to a slurry of 12.5 g. (0.100 mole) of the pyridone in 100 ml. of ethanol. N-Dodecyl *p*-toluenethiolsulfonate (35.6 g., 0.100 mole) was then added, and the reaction mixture was heated under reflux with stirring for 5.5 hours. When the reaction mixture was allowed to cool to room temperature, a tan precipitate formed and was recrystallized from ethanol to give 24.0 g. (74%) of the product 3-dodecyl - 4 - hydroxy-6-methyl-2(1H)-pyridone as white crystals, m.p. 113–114° C. A second recrystallization from ethanol gave the pure product as white crystals, m.p. 113.5–114.5° C. (This reaction was also carried out successfully in aqueous dimethylformamide).

*Analysis.*—Calcd. for $C_{18}H_{31}NO_2S$: C, 66.41; H, 9.60; N, 4.30. Found: C, 66.6; H, 9.59; N, 4.1.

EXAMPLE 16.—1,6-Dimethyl-3-dodecylthio-4-hydroxy-2(1H)-pyridone

A solution of the monosodium salt of 1,6-dimethyl-4-hydroxy-2(1H)-pyridone was prepared by adding 4.00 g. (0.100 mole) of sodium hydroxide in 50 ml. of water to a slurry of 13.9 g. (0.100 mole) of the pyridone in 100 ml. of dimethylformamide. n-Dodecyl p-toluenethiolsulfonate (35.6 g., 0.100 mole) was then added, and the reaction mixture was heated under reflux with stirring for 4.5 hours. When the reaction mixture was allowed to cool to room temperature, there was formed an oily precipitate; which, when triturated with dimethylformamide formed a white, crystalline solid. The solid was recrystallized from aqueous dimethylformamide to give 20.3 g. (62%) of the product 1,6-dimethyl - 3 - dodecylthio - 4 - hydroxy-2(1H)-pyridone as white crystals, m.p. 113–115° C. A second recrystallization from aqueous dimethylformamide gave the pure product, m.p. 117–118.5° C.

*Analysis.*—Calcd. for $C_{19}H_{33}NO_2S$: C, 67.21; H, 9.79; S, 9.44. Found: C, 66.9; H, 9.75; S, 9.2.

EXAMPLE 17.—Monosodium Salt of 3-Dodecylthio-4-hydroxy-6-methyl-2(1H)-pyridone A mixture of 3-dodecylthio - 4 - hydroxy - 6 - methyl-2(1H)-pyridone (10 g., 0.031 mole) and 1.24 g. (0.0310 mole) of sodium hydroxide in 100 ml. of ethanol was stirred at room temperature for three hours. The resulting solution was filtered to remove a small amount of insoluble material and then evaporated to dryness (*in vacuo*) to give 10.1 g. of the product, m.p. >250° C.

EXAMPLE 18.—4-Hydroxy-6-methyl-3-(2-methylthioethylthio)-2(1H)-pyridone

A mixture of the monosodium salt of 4-hydroxy-6-methyl - 2(1H) - pyridone (7.4 g., 0.050 mol), 2-methylthioethyl p-methoxybenzenethiolsulfonate (13.9 g., 0.050 mol), and 2B absolute ethanol (125 ml.) was heated at reflux with stirring for 3 hours. The ethanol was removed by distillation *in vacuo* and the residue triturated with water (75 ml.). The crude product was removed by filtration, 7.7 g. (m.p. 158–166° C., 53% yield); a portion recrystallized from ethanol gave the pure product, m.p. 184–185° C. The filtrate contained an oil layer (3.6 g. of unreacted 2-methylthioethyl p-methoxybenzenethiolsulfonate).

*Analysis.*—Calcd. for $C_9H_{13}NO_2S_2$: C, 46.7; H, 5.66; N, 6.06. Found: C, 47.2; H, 5.63; N, 5.9.

EXAMPLE 19.—4-Hydroxy-6-methyl-3-(2-methylthioethylthio)-2(1H)-pyridone

A solution of the monosodium salt of 4-hydroxy-6-methyl - 2(1H) - pyridone was prepared by adding 8.0 g. (0.20 mole) of sodium hydroxide in 100 ml. of water to 25.0 g. (0.200 mole) of the pyridone in 200 ml. of ethanol. 2-Methylthioethyl p-toluenethiolsulfonate (35.3 g., 0.200 mole) was added, and the mixture was heated under reflux with stirring for 5.5 hours. The reaction mixture was then concentrated to 100 ml. and the solid precipitate (36.8 g., m.p. 179–184° C.) was collected on a filter, dried and recrystallized from ethanol to give 30.4 g. (66%) of the product 4-hydroxy-6-methyl-3-(2-methylthioethylthio) - 2(1H) - pyridone as white crystals, m.p. 185–186.5° C. A second recrystallization from ethanol increased the melting point to 186–187.5° C.

EXAMPLE 20.—1,6-Dimethyl-4-hydroxy-3-methylthio-2(1H)-pyridone 1,6-Dimethyl - 4 - hydroxy-2(1H)-pyridone (17.2 g., 0.124 mol), was dissolved in a solution of sodium hydroxide (5.0 g., 0.124 mol) and water (300 ml.). Methyl p-toluenethiolsulfonate (25.0 g., 0.124 mol) was added and the mixture heated at reflux for 7.5 hours. Some of the water (ca. 200 ml.) was removed by distillation *in vacuo* and the resultant slurry was filtered, 12.5 g. (m.p. 115–225° C., 38% yield); after two recrystallizations from 2-propanol, the pure product was obtained, m.p. 156.5–158° C. The aqueous filtrate was acidified with dilute HCl producing 12.0 g. (63% yield) of the by-product p-toluenesulfinic acid, m.p. 78–83° C.

*Analysis.*—Calcd. for $C_8H_{11}NO_2S$: C, 51.87; H, 5.99; N, 7.56. Found: C, 51.7; H, 5.96; N, 7.0.

EXAMPLE 21.—1,6-Dimethyl-3-(2,4-dinitrophenylthio)-4-hydroxy-2(1H)-pyridone

A mixture of 11.6 g. (0.0494 mole) of 2,4-dinitrobenzenesulfenyl chloride and 7.0 g. (0.50 mole) of 1,6-dimethyl - 4 - hydroxy - 2(1H) - pyridone and 10 ml. of pyridine in 150 ml. of acetonitrile was heated under reflux with stirring for 18 hours. The resulting yellow precipitate was collected on a filter, washed with acetonitrile, dried *in vacuo* and recrystallized from aqueous dimethyl sulfoxide to give the pure product 1,6-dimethyl - 3 - (2,4-dinitrophenylthio) - 4 - hydroxy - 2(1H) - pyridone as a yellow, crystalline solid, m.p. 315° C. (dec.).

*Analysis.*—Calcd. for $C_{13}H_{11}N_3O_6S$: C, 46.29; H, 3.29; N, 12.46. Found: C, 45.9; H, 3.23; N, 12.5.

EXAMPLE 22.—4-Hydroxy-3-isopentylthio-6-methyl-2(1H)-pyridone

To a slurry of 12.5 g. (0.100 mol) 4-hydroxy-6-methyl-2(1H)-pyridone in 100 ml. of ethanol was added an aqueous solution of base (4.0 g., 0.10 mol) NaOH in 50 ml. water. To the resulting clear solution was added 25.8 g. (0.100 mol) isopentyl - p - toluene thiolsulfonate. The resulting mixture was heated at reflux temperature (ca. 78° C.) for 6 hours, then stirred at room temperature overnight. The solvent was removed *in vacuo* and the residue dissolved in a $CH_2Cl_2H_2O$ system. The organic layer was separated, dried ($Na_2SO_4$), and evaporated *in vacuo* to recover 22.0 g. of crude product, m.p. 165–170° C. The solids were recrystallized from toluene to recover 16.0 g. (70%) of pure compound, m.p. 172–174° C.

*Analysis.*—Calcd. for $C_{11}H_{17}NO_2S$: C, 58.12; H, 7.54; N, 6.16. Found: C, 58.20; H, 7.52; N, 6.22.

EXAMPLE 23.—4-Hydroxy-6-methyl-3-n-pentylthio-2(1H)-pyridone

To a slurry of 37.5 g. (0.300 mol) of 4-hydroxy-6-methyl-2(1H)-pyridone in 200 ml. ethanol was added a solution of 12.0 g. (0.300 mol) of NaOH in 100 ml. water. To the resulting clear solution was added 54.7 g. (0.245 mol) of n-hexyl-methane thiolsulfonate. The mixture was heated at reflux for 3 hours then stirred at room temperature overnight. The solvent was removed *in vacuo* and the residue was slurried in water and extracted with methylene chloride. The organic phase was dried ($Na_2SO_4$) and evaporated *in vacuo* to recover a light yellow solid. The solid was recrystallized from petroleum ether (96–99° C.) to recover 45 g. (81%) of light yellow crystalline platelets, m.p. 99–102° C.

*Analysis.*—Calcd. for $C_{12}H_{19}NO_2S$: C, 59.72; H, 7.93; S, 13.28. Found: C, 60.1; H, 7.66; S, 13.4.

EXAMPLE 24.—4-Hydroxy-6-methyl-3-methylsulfinyl-2(1H)-pyridone

To a solution of 3.42 g. (0.0183 mole) of 4-hydroxy-6-methyl-3-methylthio-2(1H)-pyridone in 50 ml. of glacial acetic acid was added 2.4 g. (0.22 mole) of 30% hydrogen peroxide. The colorless solution was stirred at room temperature for five hours, diluted with 150 ml. of toluene and evaporated to dryness *in vacuo* at 40° C. (bath temperature). The remaining white solid was twice recrystallized from ethanol to give the pure product as white crystals, m.p. 206–208° C.

*Analysis.*—Calcd. for $C_7H_9NO_3S$: C, 44.91; H, 4.84; N, 7.48; S, 17.13. Found: C, 45.0; H, 4.85; N, 7.3; S, 17.0.

EXAMPLE 25.—4-Hydroxy-3-isopropylsulfinyl-6-methyl-2(1H)-pyridone

A solution of 1.99 g. (0.00924 mole) of 4-hydroxy-3-isopropylthio-6-methyl-2(1H)-pyridone and 1.2 g. (0.011 mole) of 30% hydrogen peroxide in 25 ml. of glacial acetic acid was stirred at room temperature for three hours, diluted with 75 ml. of toluene and evaporated to dryness in vacuo at 40° C. (bath temperature). The remaining white solid was twice recrystallized from ethanol to give the pure product as white crystals, m.p. 194–195° C. (dec.).

*Analysis.*—Calcd. for $C_9H_{13}NO_3S$: C, 50.21; H, 6.09; N, 6.51; S, 14.89. Found: C, 50.3; H, 6.13; N, 6.8; S, 14.9.

EXAMPLE 26. — 3-p-Chlorophenylsulfinyl-4-hydroxy-6-methyl-2(1H)-pyridone

A solution of 2.68 g. (0.00945 mole) of 3-p-chlorophenylthio-4-hydroxy-6-methyl-2(1H)-pyridone and 1.2 g. (0.011 mole) of 30% hydrogen peroxide in 30 ml. of glacial acetic acid was stirred at room temperature for 15 hours. After that period of time the first crop of white crystalline product had separated and was collected on a filter. A second crop of crystalline product was obtained upon evaporation of the filtrate to dryness in vacuo. Recrystallization of the combined crops from ethanol gave the pure product as white crystals, m.p. 203–204° C. (dec.).

*Analysis.*—Calcd. for $C_{12}H_{10}ClNO_3S$: C, 50.79; H, 3.55; Cl, 12.50; N, 4.94; S, 11.30. Found: C, 50.6; H, 3.58; Cl, 12.4; N, 5.0; S, 11.4.

EXAMPLE 27.—4-Hydroxy-6-methyl-3-phenylsulfinyl-2(1H)-pyridone

A solution of 6.99 g. (0.0280 mole) of 4-hydroxy-6-methyl-3-phenylthio-2(1H)-pyridone and 3.9 g. (0.035 mole) of 30% hydrogen peroxide in 75 ml. of glacial acetic acid was stirred at room temperature for 24 hours. The solution was then diluted with 200 ml. of toluene and evaporated to dryness in vacuo. Two recrystallizations of the solid residue from ethanol gave the pure product as white crystals, m.p. 184.5–186° C.

*Analysis.*—Calcd. for $C_{12}H_{11}NO_3S$: C, 57.81; H, 4.45; N, 5.62. Found: C, 57.9; H, 4.48; N, 5.7.

EXAMPLE 28.—3-Benzylsulfinyl-4-hydroxy-6-methyl-2(1H)-pyridone

A solution of 2.47 g. (0.00938 mole) of 3-benzylthio-4-hydroxy-6-methyl-2(1H)-pyridone and 1.2 g. (0.011 mole) of 30% hydrogen peroxide in 40 ml. of glacial acetic acid was stirred at room temperature for 24 hours. The acetic acid was removed azeotropically under reduced pressure, using a mixture (5:1) of toluene and ethanol. The light yellow solid residue was twice recrystallized from toluene to give the pure product as white crystals, m.p. 201–202° C.

*Analysis.*—Calcd. for $C_{13}H_{13}NO_3S$: C, 59.30; H, 4.98; N, 5.32. Found: C, 57.37; H, 4.89; N, 5.14.

EXAMPLE 29.—3-n-Dodecylsulfinyl-4-hydroxy-6-methyl-2(1H)-pyridone

To a mixture of 3.25 g. (0.00952 mole) of 3-n-dodecylthio-4-hydroxy-6-methyl-2(1H)-pyridone and 35 ml. of glacial acetic acid was added 1.2 g. (0.011 mole) of 30% hydrogen peroxide with stirring. Stirring was continued at room temperature, complete solution being attained after the first hour. The reaction mixture was stirred an additional 22 hours at ambient temperature during which time the crude product separated as a white precipitate which was collected on a filter. The filtrate was diluted with toluene-ethanol (5:1) and evaporated to dryness in vacuo to give a second crop of solid, crude product. The combined crude product was twice recrystallized from cyclohexane to give the pure product as white crystals, m.p. 126–127° C.

*Analysis.*—Calcd. for $C_{18}H_{31}NO_3S$: C, 63.30; H, 9.15; S, 9.39. Found: C, 63.45; H, 9.25; S, 9.4.

EXAMPLE 30.—4-Hydroxy-6-methyl-3-methylsulfonyl-2(1H)-pyridone

To a hot (ca. 80–90° C.) solution of 5.2 g. (0.026 mole) of 4-hydroxy-6-methyl-3-methylthio-2(1H)-pyridone in 75 ml. of glacial acetic acid was added 14 ml. (0.12 mole) of 30% hydrogen peroxide. The solution was then heated on the steam bath and cooled to room temperature in an ice bath. The solution was diluted with 200 ml. of toluene and evaporated to dryness in vacuo, leaving the solid crude product, which was twice recrystallized from ethanol to give the pure product as white needles, m.p. 220–223° C.

*Analysis.*—Calcd. for $C_7H_9NO_4S$: C, 41.37; H, 4.46; N, 6.89; S, 15.78. Found: C, 41.4; H, 4.42; N, 6.9; S, 16.2.

EXAMPLE 31.—4-Hydroxy-3-isopropylsulfonyl-6-methyl-2(1H)-pyridone

To a hot (ca. 80–90° C.) solution of 4.0 g. (0.017 mole) of 4-hydroxy-3-isopropylthio-6-methyl-2(1H)-pyridone in 50 ml. of glacial acetic acid was added 9 ml. (0.08 mole) of 30% hydrogen peroxide. The solution was heated on the steam bath for 15 minutes and cooled to room temperature in an ice bath. The reaction mixture was then diluted with 150 ml. of toluene and evaporated to dryness in vacuo, leaving the crude, white, solid product, which was recrystallized from ethanol to give the pure product as white needles, m.p. 196–198.5° C.

*Analysis.*—Calcd. for $C_9H_{13}NO_4S$: C, 46.74; H, 5.66; N, 6.06; S, 13.86. Found: C, 47.0; H, 5.70; N, 5.9; S, 13.9.

EXAMPLE 32.—3-p-Chlorophenylsulfonyl-4-hydroxy-6-methyl-2(1H)-pyridone 3-p-Chlorophenylthio-4-hydroxy-6-methyl-2(1H)-pyridone (2.68 g., 0.00894 mole) was dissolved in 25 ml. of hot glacial acetic acid, and 4 ml. (0.04 mole) of 30% hydrogen peroxide was added. The reaction mixture was heated on the steam bath, cooled to room temperature and allowed to stand for 15 hours after which period of time the product had separated as white crystals, which were collected on a filter and recrystallized from glacial acetic acid to give the product as white crystals, m.p. 301–304° C. (dec.).

*Analysis.*—Calcd. for $C_{12}H_{10}ClNO_4S$: C, 48.08; H, 3.36; Cl, 11.83; N, 4.67; S, 10.70. Found: C, 48.0; H, 3.39; Cl, 11.9; N, 4.7; S, 10.5.

EXAMPLE 33.—4-Hydroxy-6-methyl-3-phenylsulfonyl-2(1H)-pyridone

To a hot (ca. 80–90° C.) solution of 14.0 g. (0.0528 mole) of 4-hydroxy-6-methyl-3-phenylthio-2(1H)-pyridone in 150 ml. of glacial acetic acid was added 28 ml. (0.024 mole) of 30% hydrogen peroxide. The reaction mixture was heated on the steam bath for 15 minutes, cooled to room temperature in an ice bath and allowed to stand for 15 hours after which period of time the product had separated as white crystals, which were collected on a filter and recrystallized from glacial acetic acid to give the pure product as white crystals, m.p. 268–270° C. (dec.).

*Analysis.*—Calcd. for $C_{12}H_{11}NO_4S$: C, 54.33; H, 4.18; N, 5.28; S, 12.09. Found: C, 54.5; H, 4.20; N, 5.0; S, 12.5.

EXAMPLE 34.—3-Benzylsulfonyl-4-hydroxy-6-methyl-2(1H)-pyridone

A solution of 7.42 g. (0.0266 mole) of 3-benzylthio-4-hydroxy-6-methyl-2(1H)-pyridone and 10 g. (0.09 mole) of 30% hydrogen peroxide in 50 ml. of glacial acetic acid was heated on the steam bath for 30 minutes, cooled to room temperature and poured into 250 ml. of ice water. The white, solid precipitate was collected on a filter and dried in vacuo over calcium chloride. The crude substance was recrystallized from isopropanol to give the pure product as white needles, m.p. 229–231° C.

*Analysis.*—Calcd. for $C_{13}H_{13}NO_4S$: C, 55.90; H, 4.69; S, 11.48. Found: C, 55.85; H, 4.78; S, 11.89.

EXAMPLE 35.—3-n-Dodecylsulfonyl-4-hydroxy-6-methyl-2(1H)-pyridone

A solution of 5.7 g. (0.016 mole) of 3-n-dodecylthio-4-hydroxy-6-methyl-2(1H)-pyridone and 7.6 g. (0.067 mole) of 30% hydrogen peroxide in 40 ml. of glacial acetic acid was heated on the steam bath for 20 minutes. The reaction mixture was cooled, and the acetic acid was removed azeotropically by dilution of the reaction mixture with toluene-ethanol (5:1) and subsequent evaporation *in vacuo*. The residual solid product was twice recrystallized from cyclohexane to give the pure product as white crystals, m.p. 132–134° C.

*Analysis.*—Calcd. for $C_{18}H_{31}NO_4S$: C, 60.47; H, 8.74; N, 3.92; S, 8.97. Found: C, 60.3; H, 9.10; N, 3.8; S, 9.2.

EXAMPLE 36.—4-Hydroxy-3-isopentylsulfinyl-6-methyl-2(1H)-pyridone

A solution of 9.1 g. (0.040 mol) of 4-hydroxy-3-isopentyl-6-methyl-2(1H)-pyridone and 4.85 g. (0.0440 mol) of 30% hydrogen peroxide in 40 ml. glacial acetic acid was stirred at room temperature for 18 hours. The solution was then poured into 200 ml. of ice water. The resulting pink precipitate was filtered and dried *in vacuo*. The pink solids were recrystallized from a mixture of cyclohexane-toluene to recover pale pink crystalline solids, m.p. 156–158° C.

*Analysis.*—Calcd. for $C_{11}H_{17}NO_3S$: C, 54.29; H, 7.04; S, 13.18. Found: C, 54.15; H, 6.92; S, 13.05.

The compounds of this invention are, in general, useful as plant growth regulating agents for cereal grasses, including wheat and corn, and cotton, beans and the like. Some are also useful as antimicrobial agents for the control of such organisms as *Mycobacterium phlei* and *Trichophyton mentagrophytes*. Others are useful as pesticides for controlling plant pests. Still others are useful as intermediates for making phosphorothioate pesticides. Some compounds have several types of activity. This is not to suggest that all of the compounds are equally effective against the same organisms, plants or pests or at the same concentrations. Plant growth stunters herein are used in pre-emergent application to the soil, i.e., before seeds have sprouted, or in foliar application to the growing plant. Plant growth stimulators are applied to the growing plant. For plant growth control, antimicrobial and pesticidal usage, the compound can be employed in an unmodified form or dispersed on a finely divided solid and employed as dusts. Such mixtures can also be dispersed in water with or without the aid of a surface-active agent and the resulting aqueous suspensions employed as sprays. In other procedures, the products can be employed as active constituents in solvent solutions, oil-in-water or water-in-oil emulsions or aqueous dispersions. The augmented compositions are adapted to be formulated as concentrates and subsequently diluted with additional liquid or solid adjuvants to produce ultimate treating compositions. Good results are obtained when employing compositions containing from about 10 to about 20 pounds per acre of active material for pre-emergent application and from about 0.5 to about $4 \times 10^3$ parts per million (p.p.m.) of active agent for foliar application.

In the following Table, data are presented showing the activity of compounds, listed by example number, as plant growth stunters wherein the active agent is used in pre-emergent and foliar applications. Plant growth stunting is measured as the difference between normal growth and stunted growth, expressed as a percentage of the normal growth.

TABLE I

Plant Growth, Percent Reduction/Application Rate

| Pre-emergent example | Percent reduction/lb. acre | Foliar example | Percent reduction/ p.p.m.×10³ |
|---|---|---|---|
| 13 | White winter wheat 25/10. | 1 | Beans 35/4. |
| 20 | Beans 50/10. Corn 50/10. | 18 | Beans 15/4. |
| 23 | Pigweeds 95/10. | | |
| 32 | Pigweeds 50/20. Wild mustard 50/20. | | |
| 36 | Crabgrass 50/10. Pigweeds 80/10. | | |

In the following Table, data are presented showing the activity of compounds, listed by example number, as plant growth stimulators, wherein the active agent is used in foliar applications. Plant growth stimulation is measured as the difference between normal growth and increased growth, expressed as a percentage of the normal growth.

TABLE II

Plant Growth, Percent Increase/Application Rate

| Example | Percent increase/ p.p.m.×10³ |
|---|---|
| 4 | Beans 65/4. |
| 13 | Beans 75/4. |
| 14 | Beans 25/4. |

The following Table presents minimum growth inhibitory concentrations of compounds of the indicated examples as determined by conventional agar dilution tests for the indicated organisms. At the indicated concentrations, no growth of the organisms was observed.

TABLE III

Minimum Growth Inhibitory Concentrations, p.p.m.

| Example | Mp | Tm | Bs | Pp | Cf |
|---|---|---|---|---|---|
| 12 | 500 | | | | |
| 13 | 500 | | | | |
| 23 | 100 | 500 | | | |
| 29 | | | 500 | | |
| 30 | | 500 | | 500 | 500 |
| 35 | | 500 | 500 | | 100 |

Controls abundant growth.

NOTE.—Mp=*Mycobacterium phlei*; Tm=*Trichophyton mentagrophytes* Bs=*Bacillus subtilis*; Pp=*Pullularia pullulans*; Cf=*Cephaloascus fragans*

The following Table presents insecticidal and pesticidal activity of compounds of the given examples using conventional agricultural tests.

TABLE IV

Insecticidal and Plant Pesticidal Activity, Percent Control/p.p.m. concentration

| Example | Dg | Aa | Bl | Pi | Po | Pe | Aal | Pm | M |
|---|---|---|---|---|---|---|---|---|---|
| 5 | 100/25 | | | | | | | | |
| 22 | | 100/500 | | | | | | | |
| 25 | | | 64/400 | | | | | | |
| 27 | | | 50/400 | | | | | | |
| 28 | | | 75/400 | | | | | | |
| 9 | | | | 75/400 | 75/400 | | | | |
| 10 | | | | | | 100/500 | | | |
| 17 | | | | | | | 100/1 | | |
| 24 | | | 95/400 | | | | | | |
| 30 | | | 90/400 | | | | | | |
| 31 | | | | | | | | | 50/50 |
| 33 | | | | | | | | 90/400 | |

NOTE.—Dg=*Diabrotica galerucidae* (southern corn root worm); Aa=*Ambylomma americanum* (lone star tick); Bl=*Bremia lactucae* (downy mildew); Pi=*Phytophthora infestans* tomato late blight); Po=*Piricularia oryzae* (rice blast); Pe=*Prodenia eridania* (southern army worm); Aal=*Aedes aegypti* larvae (yellow fever mosquito larvae); Pm=Powdery mildew; Mi=*Meliodogyne incognita* (rootknot nematode.)

The compounds of Examples 15, 16 and 21 are precursors for the corresponding O,O-diethyl O-(1,2-dihydro-6-methyl-3-(substituted thio)-2-oxo-4-pyridyl)phosphorothioate insecticides.

What is claimed is:

1. A compound represented by the formula

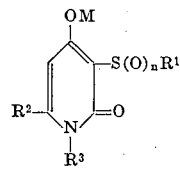

wherein M represents hydrogen or an alkali metal, $R^1$ represents $C_1$-$C_4$ alkyl, isopentyl and linear alkyl having up to 20 carbon atoms, phenyl, halophenyl, nitrophenyl, 2-(lower alkylthio)ethyl, allyl, benzyl or lower alkylphenyl, $R^2$ represents hydrogen or lower alkyl, $R^3$ represents hydrogen or lower alkyl and $n$ represents an integer from 0 to 2.

2. The compound of Claim 1 which is 4-hydroxy-6-methyl-3-methylthio-2(1H)-pyridone.

3. The compound of Claim 1 which is 4-hydroxy-6-methyl-3-ethylthio-2(1H)-pyridone.

4. The compound of Claim 1 which is 3-p-chlorophenylthio-4-hydroxy-6-methyl-2(1H)-pyridone.

5. The compound of Claim 1 which is 3-benzylthio-4-hydroxy-6-methyl-2(1H)-pyridone.

6. The compound of Claim 1 which is 1,6-dimethyl-4-hydroxy-3-methylthio-2(1H)-pyridone.

7. The compound of Claim 1 which is 4-hydroxy-6-methyl-3-$n$-pentylthio-2(1H)-pyridone.

8. The compound of Claim 1 which is 4-hydroxy-6-methyl-3-methylsulfonyl-2(1H)-pyridone.

9. The compound of Claim 1 which is 3-$n$-dodecylsulfonyl-4-hydroxy-6-methyl-2(1H)-pyridone.

10. The compound of Claim 1 which is 4-hydroxy-6-methyl-3-phenylthio-2-(1H)-pyridone.

11. The compound of Claim 1 which is 1,6-dimethyl-3-dodecylthio-4-hydroxy-2(1H)-pyridone.

12. The compound of Claim 1 which is monosodium salt of 3-dodecylthio-4-hydroxy-6-methyl-2(1H)-pyridone.

13. The compound of Claim 1 which is 3-benzylsulfinyl-4-hydroxy-6-methyl-2(1H)-pyridone.

References Cited
UNITED STATES PATENTS

| | | | |
|---|---|---|---|
| 3,692,793 | 9/1972 | Wang et al. | 260—294.8 F |
| 3,729,476 | 4/1973 | Austin et al. | 260—295.5 A |

OTHER REFERENCES

Roberts et al., Basic Principles of Organic Chemistry, Benjamin Publishers, p. 806, 1965 QD 251 R58 C.6.

Karrer, Organic Chemistry, 4th English Edition, p. 928, Elsevier Pub. Co. (New York).

Chemical & Engineering News, p. 18, Apr. 3, 1972.

ALAN L. ROTMAN, Primary Examiner

U.S. Cl. X.R.

260—294.8 G, 297 Z; 71—94; 424—263